United States Patent Office 3,573,067
Patented Mar. 30, 1971

3,573,067
PROCESS FOR RADIATION STERLIZING A PACKAGED PRECOOKED MEAT AND GRAVY PRODUCT
Gary W. Shults, Milford, Mass., assignor to the United States of America as represented by the Secretary of the Army
No Drawing. Filed Oct. 8, 1968, Ser. No. 766,000
Int. Cl. A23b 1/00, 1/06; B65b 55/02
U.S. Cl. 99—157
8 Claims

ABSTRACT OF THE DISCLOSURE

An improved process for sterilizing a precooked-meat and gravy product with high energy ionizing radiation wherein the meat and gravy are each frozen separately and kept frozen and apart during the sterilization step and subsequently allowed to thaw and mix with the container.

The invention described herein may be manufactured, used, and licensed by or for the Government for governmental purposes without the payment to me of any royalty thereon.

This invention relates to an improved process for sterilizing a meat and gravy combination and, more particularly, to a process for sterilizing a precooked-meat and gravy combination with high energy ionizing radiation.

Sterilization of food by high energy ionizing radiation offers considerable promise as an alternative to the more conventional thermal sterilization process. Radiation sterilization can be characterized as "cold" sterilization, that is, the temperature of the product so sterilized is never increased to any significant degree whereas thermal sterilization requires that the temperature of the product be raised to a level sufficient to inactivate all microorganisms present or likely to be present therein. Thermal sterilization of food products inherently produces a product exhibiting characteristics found in a grossly overcooked item, such as, loss of texture, flavor, color, vitamins, etc. To be able to sterilize food items without adversely affecting the properties of such items to any significant degree is a continuing goal of many food technologists and processers.

While radiation sterilization does not result in an overcooked product, there are as yet certain unresolved disadvantages stemming from this processing technique which tend to vary with the product being processed. For example, there have been observed certain objectionable organoleptic changes which affect color and texture and produce off-odors and irradiation flavors. Recent advances have indicated that by selective control of certain of the processing variables, it is possible, in some cases, to significantly reduce some or all of the observed objectionable changes.

The current trend in the food service industry is in the direction of so-called convenience foods, i.e., portion controlled, quick-serve items. One food item which would obviously be an important member in a menu based upon convenience foods would be a precooked-meat and gravy combination. Such an item could be expected to have wide acceptance both by the consumer and the food service industry since it fits within recognizable food patterns and habits and would constitute the principal or main portion of a given meal. When thermally sterilized, meat and gravy combinations experience significant changes in texture and flavor of such an order as to produce an item quite unlike freshly prepared meat and gravy products and consequently not likely to meet with any great public acceptance. Sterilization with ionizing radiation would appear to obviate the unwanted effects of thermal sterilization. It has been discovered, however, that radiation sterilization produces certain undesirable organoleptic changes such as discoloration, irradiation flavor and loss of texture of the meat component caused by the destruction of the connective tissue within the meat. Attempts to eliminate or reduce these radiation induced changes have been heretofore unsuccessful. With many food items, irradiation at low temperatures has reduced the organoleptic changes to an acceptable level, but this acceptable level has not been achieved with meat and gravy so processed.

Unexpectedly, it has been discovered that if the meat and gravy components are irradiated separately and thereafter combined, the resulting product is significantly improved in quality and, in fact, tests have demonstrated that such a product more nearly approximates the properties of a cooked non-irradiated product than the properties of a product obtained when meat and gravy are frozen together and then irradiated. It is to be understood that the gravy component constitutes at least 25% by weight of the total weight of the combination of meat and gravy.

While it would be obvious to package the components of the meat and gravy combination in separate containers or a single container having internal means to divide the container so that the contents may be held apart during radiation sterilization, this approach has proven to be unfeasible for a number of reasons. First, there is the economic factor involved in the separate packaging of the components and secondly, such packaging prevents the flavors of the two components, meat and gravy, from blending together.

The novel process in the instant invention overcomes the above-mentioned problems and provides a highly acceptable radiation-sterilized, cooked meat and gravy product. The product is sterilized while the components are kept apart and, subsequent to sterilization, the components are allowed to mix or blend. This is accomplished by inserting within a container the desired quantity of precooked meat and the desired quantity of a normally liquid gravy which components have been separately frozen to a solid state. Obviously, while so frozen, the solid components will not mix or blend to any degree. The components may, alternatively, be separately frozen and then inserted within the container, the liquid gravy may be placed in the container and frozen after which the meat is added and frozen, or liquid gravy may be inserted within the container and frozen followed by the addition of frozen meat thereto. The net result of any of the foregoing techniques is that there will be present in the container two solid, immiscible components. These components are kept in the frozen state until after radiation sterilization whereupon the product is brought to ambient or room temperature allowing the two components to thaw and mix within the container.

Any variety of meat may be employed in the instant invention. Meat items such as beef, pork, lamb, veal and poultry are preferred variety because of their widespread acceptability. The meat may be in the form of a solid chunk but will preferably be in the form of slices, small pieces or chunks or ground meat patties. Precooking the meat results in a product that is not only ready-to-eat but also serves to develop the characteristic flavor of cooked meat and to inactivate proteolytic enzymes normally present in the meat which enzymes are not inactivated by the ionizing radiation employed to sterilize the product. In order to inactivate the proteolytic enzymes, it is necessary that the internal temperature be raised to 60° C. or higher. Therefore, in precooking the meat, it is essential that the internal temperature be raised to 60° or higher. Precooking can be effected by any of the cooking techniques well known in the art.

The gravy component serves to keep the meat moist, attractive and to contribute certain flavor or taste values to the product. The gravy is liquid at room temperature and consists chiefly of water, together with salts, spices, natural or artificial flavor additives and optionally, a thickening agent. The formulations for gravies are well known in the art, and any gravy suitable for use with the particular variety of meat employed will be suitable for this invention. Therefore, it will not be necessary to elaborate further on the formulation of gravies.

As has already been noted, the food components of the meat and gravy combinations may be frozen within the container or prior to insertion in the container. In either event, it is necessary to lower the temperature to a point at which the gravy becomes solid to obtain the benefits of this invention. It is preferred, however, that the temperature of both components be lowered to at least $-20°$ C. and maintained at this or a lower temperature during the irradiation step.

The meat and gravy combination may be packaged in any liquid or gas-tight container, inert to the components of such a combination. Such package or container may be of the rigid type such as coated steel cans, or of the flexible type, such as pouches or bags formed of flexible sheets of food grade polymers or laminates of polymer sheets which may also include aluminum foil. Before the frozen meat and gravy components are sealed within the container, oxygen is removed by means of a vacuum or by flushing with an inert gas such as nitrogen or carbon dioxide. It is preferred, however, that the container be sealed under vacuum.

Sterilization of the frozen containers within a hermetically sealed container is accomplished by exposure of the contents to a sterilizing dose of high energy ionizing radiation. Such radiation has energy levels that range from 750,000 to 10,000,000 electron volts. The types of ionizing radiation that may be employed as well known in the art, and may include, for example, particle radiation such as electrons, or, electro-magnetic radiation such as gamma rays. It is preferred that the energy level of the ionizing radiation be less than 12,000,000 electron volts in order to produce the possibility of inducing radioactivtiy in material treated. Sterilization of food stuffs normally requires dosages of ionizing radiation in the range of approximately 1 to 10 megarads and preferably within the range of approximately 3.0 to 5.6 megarads. Rad is a unit of adsorbed dose of ionizing radiation equal to an energy of 100 ergs per gram of irradiated material.

Irradiation of the samples described in the following examples was accomplished by exposing the samples to gamma radiation from a 900,000 curie cobalt 60 source. The physical arrangement of the source consisted of a pair of spaced apart parallel plaques which contained the radio isotope. The samples being treated are placed within stacked aluminum canisters and carried by conveyor between the plaques for a period of time necessary to reach the desired dosage level.

EXAMPLE 1

There is described in detail in this example the preparation of a beef and gravy product in accordance with the present invention which product is compared with a non-irradiated control and an irradiated product not processed according to this invention. A fresh U.S. Choice beef loin was roasted with dry heat to an internal temperature of $65°$ C. After cooling, the cooked beef loin was cut into $\frac{1}{16}$-inch slices. A beef gravy was prepared by combining 6 quarts of beef stock (prepared from natural juices of cooked beef), 60 grams of sodium chloride, 3 grams of ground black pepper, 3 grams of onion powder and 10 grams of garlic powder. A quantity of the liquid gravy was added to each of 12 tin-clad steel cans sufficient to occupy approximately $\frac{1}{2}$ of the volume of each of the cans. The temperature of the gravy within the cans was then lowered to approximately $-80°$ C. causing the gravy to solidify. A number of beef slices were then placed on top of the solid gravy within the containers, substantially filling the containers and the temperature of the meat slices was then lowered to approximately $-80°$ C. The containers were hermetically sealed under a vacuum of 25-inches (gage pressure). Six of the twelve samples were irradiated while held at $-80°$ C. to a dose in the range of from 4.5 to 5.6 megarads. Six samples were held as a control. An additional six samples were prepared in the same fashion except that the gravy and meat were mixed and then frozen while mixed prior to irradiation. Following irradiation the sterilized samples were allowed to thaw and reach room temperature. In the case of those samples where the meat and gravy components were frozen separately, the thawing of the contents permits the gravy to blend and combine with the meat within the can. The frozen control sample, the irradiated samples with the meat and gravy frozen separately and the irradiated samples with the meat and gravy frozen together, were evaluated after two months storage for certain sensory characteristics by a panel of trained food testers. The results of this evaluation are set forth in Table 1. The ratings are made on an intensity scale 1 (none to 9 (extreme). Referenced ratings were obtained using a hedonic scale of 1 (dislike extremely) to 9 (like extremely). In the table, sample A refers to the frozen non-irradiated sample which was allowed to thaw just before evaluation. Sample B is the irradiated sample wherein the meat and gravy were frozen separately and sample C is the irradiated sample wherein the meat and gravy were frozen together prior to irradiation. All samples were heated to $55°$ C. prior to evaluation. The results of the evaluation demonstrate the superiority of sample B in terms of discoloration, irradiation flavor and friability (connective tissue structure) over sample C. The preference rating for sample B is indicated to be closer to the preference rating of sample A (the control) than to sample C.

TABLE 1

| Sample | Discoloration | Off odor | Irradiation flavor | Off flavor | Mushiness | Friability | Preference |
|---|---|---|---|---|---|---|---|
| A | 1.5 | 1.6 | 1.0 | 1.1 | 1.4 | 1.2 | 7.0 |
| B | 1.7 | 2.2 | 1.5 | 1.6 | 2.2 | 1.5 | 6.6 |
| C | 2.4 | 2.1 | 2.1 | 1.7 | 2.1 | 1.9 | 6.1 |

I claim:
1. A process for sterilizing a precooked-meat and liquid gravy product enclosed within a sealed container with high energy ionizing radiation said process comprising the steps of
   (a) inserting within a liquid and gas-tight container a quantity of cooked meat and a quantity of gravy, said meat and said gravy are separately frozen to a solid state and while frozen remain separate within said container,
   (b) hermetically sealing the opening of said container after removing substantially all of the oxygen from within said container,
   (c) exposing said meat and gravy within said container to a sterilizing dose of high energy ionizing radiation while said meat and gravy are maintained in a frozen and separate condition within said container, and
   (d) returning said container and its sterilized contents to an ambient temperature whereupon the contents of said sealed container thaw and mix.

2. A process according to claim 1 wherein the sterilizing dose of high energy ionizing radiation ranges from 1 to 10 megarads.

3. A process according to claim 2 wherein said sterilizing dose is from 3.0 to 5.6 megarads.

4. A process according to claim 3 wherein said container is hermetically sealed under vacuum.

5. A process according to claim 4 wherein the meat and gravy are frozen to a temperature below −20° C. and the irradiation step occurs while said container and its contents are held at a temperature below −20° C.

6. A process according to claim 5 wherein the meat is precooked to an internal temperature of at least 60° C.

7. A process according to claim 6 wherein the gravy is placed in the empty container and frozen before the meat is added to the container.

8. A process according to claim 6 wherein the meat is beef.

References Cited
UNITED STATES PATENTS

| | | | |
|---|---|---|---|
| 2,768,086 | 10/1956 | Bliley | 99—192 |
| 3,244,537 | 4/1966 | Cease | 99—192 |
| 3,483,005 | 12/1969 | Urbain et al. | 99—217 |

HYMAN LORD, Primary Examiner

U.S. Cl. X.R.

99—194, 217